(12) United States Patent
Huber et al.

(10) Patent No.: US 8,310,083 B2
(45) Date of Patent: Nov. 13, 2012

(54) APPARATUS AND SYSTEM FOR POWER CONVERSION

(75) Inventors: Johannes Huber, Munich (DE); Lembit Salasoo, Schenectady, NY (US); Alexander Walsch, Eching (DE); Michal-Wolfgang Waszak, Munich (DE); Alexander Felix Fiseni, Munich (DE); Stefan Brandhoff, Haag a.d. Amper (DE); Karl Kyrberg, Munich (DE)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 12/840,423

(22) Filed: Jul. 21, 2010

(65) Prior Publication Data

US 2012/0019073 A1     Jan. 26, 2012

(51) Int. Cl.
*B60L 1/00* (2006.01)
(52) U.S. Cl. .......................................... 307/9.1
(58) Field of Classification Search ..................... 307/9.1
See application file for complete search history.

(56) References Cited

U.S. PATENT DOCUMENTS

| | | | |
|---|---|---|---|
| 4,956,608 A | 9/1990 | Dorri et al. | |
| 5,512,870 A | 4/1996 | Salasoo et al. | |
| 5,627,709 A | 5/1997 | Salasoo | |
| 5,649,353 A | 7/1997 | Salasoo et al. | |
| 5,987,097 A | 11/1999 | Salasoo | |
| 5,995,585 A | 11/1999 | Salasoo | |
| 6,281,610 B1 | 8/2001 | Kliman et al. | |
| 6,421,422 B1 | 7/2002 | Lifshin et al. | |
| 6,441,581 B1 | 8/2002 | King et al. | |
| 6,486,568 B1 | 11/2002 | King et al. | |
| 6,495,940 B2 | 12/2002 | Kliman et al. | |
| 6,768,244 B2 | 7/2004 | Ong et al. | |
| 7,027,559 B2 | 4/2006 | Wilson et al. | |
| 7,061,131 B2 | 6/2006 | King et al. | |
| 7,078,877 B2 | 7/2006 | Salasoo et al. | |
| 7,137,344 B2 | 11/2006 | Kumar et al. | |
| 7,155,075 B2 | 12/2006 | Rajendran et al. | |
| 7,190,133 B2 | 3/2007 | King et al. | |
| 7,489,048 B2 | 2/2009 | King et al. | |
| 7,489,093 B2 | 2/2009 | King et al. | |
| 7,723,932 B2 | 5/2010 | King et al. | |
| 7,750,641 B2 | 7/2010 | Runkle et al. | |

*Primary Examiner* — Robert L. Deberadinis
(74) *Attorney, Agent, or Firm* — Ziolkowski Patent Solutions Group, SC; Jean K. Testa

(57) ABSTRACT

An apparatus includes a DC-link, a voltage converter, a bus voltage controller, and a supervisory controller. The voltage converter is configured to convert a first DC voltage into a second DC voltage based on a command signal and based on an adjustment signal and to supply the second DC voltage to the DC-link. The bus voltage controller is configured to iterate calculation of the adjustment signal to communicate each iterated calculation of the adjustment signal to the voltage converter. The supervisory controller is configured to iterate calculation of the command signal and to communicate each iterated calculation of the command signal to the voltage converter and to the bus voltage controller. A frequency of the bus voltage controller to communicate each iterated calculation of the adjustment signal is higher than a frequency of the supervisory controller to communicate each iterated calculation of the command signal.

20 Claims, 3 Drawing Sheets

APPARATUS AND SYSTEM FOR POWER CONVERSION

BACKGROUND OF THE INVENTION

Embodiments of the invention relate generally to power electronics systems and, more particularly, to control of power conversion in a power electronics system.

In power electronics systems, a power conversion process may include converting power from a source into a load power and supplying the load power to a load. In one example, a DC-link or voltage bus may supply the load power to a load coupled thereto such as connecting DC/DC converters to DC/AC inverters or other DC energy sources/sinks.

In an exemplary system, a hybrid electric vehicle may employ one or more common DC-link(s) coupled to available energy sources such as, for example, batteries, capacitors, flywheels, combustion engines, fuel cells, gas turbines, or the like. The DC-link voltage of the one or more common DC-link(s) should be kept within a defined operation band. This operation band could change depending on actual load on the traction inverter(s) due to efficiency optimization reasons. In other cases, it may be preferred to have the DC-link voltage at a constant value.

One method to hold the desired DC-link voltage is to exactly balance the power commands directed into the DC-link and coming out of the DC-link so that the energy in the DC-link remains constant. This strategy involves taking into account the dynamics of all involved converters as well as any communication delay/sample rate limitations that may be manifest in the supervisory controller. However, measurement errors (e.g., noise, offset), unknown dynamics (e.g., such as those due to nonlinearities in power conversion), and time delays of communication as well as sample and hold delay by the supervisory controller can limit an exact balancing of power into and out of the DC-link.

Typically, the DC-link is equipped with one or more capacitive devices (e.g., a battery or ultracapacitor) that provides substantial capacitance to filter the voltage ripple resulting from current ripple and to buffer energy in case of high frequency mismatch or imbalance of power flow into and out of the DC-link. The substantial capacitance helps buffer energy for preventing a drop/rise of DC-link voltage between subsequent or new power commands/demands of power conversion that may be due to an imbalance between power into and out of the DC-link. For example, a large capacitor may be used where voltage on the DC-link changes slowly compared to the power imbalance. Using a large capacitor, the supervisory controller is able to balance the voltage on the DC-link. However, these large-capacitance DC-link capacitors tend to be physically large components having a significant size and weight, which may be disadvantageous, especially for mobile applications such as in a hybrid electric vehicle application. In addition, these capacitors add extra costs to the systems/applications using them.

Therefore, it would therefore be desirable to provide an apparatus and system for controlling power conversion that reduces a capacitance, size, and weight of a capacitor used to buffer energy on a power conversion DC-link.

BRIEF DESCRIPTION OF THE INVENTION

According to one aspect of the invention, an apparatus includes a DC-link, a load coupled to the DC-link, and an energy conversion system. The energy conversion system includes a first energy storage device, a first voltage converter coupled to the first energy storage device and to the DC-link, a first bus voltage controller coupled to the DC-link and to the first voltage converter, and a supervisory controller coupled to the first voltage converter and to the first bus voltage controller. The first voltage converter is configured to convert a first DC voltage from the first energy storage device into a second DC voltage based on a command signal and based on a first adjustment signal and supply the second DC voltage to the DC-link. The first bus voltage controller is configured to iterate calculation of the first adjustment signal based on the command signal and based on a measured voltage of the DC-link and communicate each iterated calculation of the first adjustment signal to the first voltage converter. The supervisory controller is configured to iterate calculation of the command signal based on the load and based on a desired DC-link voltage for the load and communicate each iterated calculation of the command signal to the first voltage converter and to the first bus voltage controller. A frequency of the first bus voltage controller to communicate each iterated calculation of the first adjustment signal is higher than a frequency of the supervisory controller to communicate each iterated calculation of the command signal.

In accordance with another aspect of the invention, an apparatus includes a voltage bus, a load coupled to the voltage bus, and a voltage converter coupled to the voltage bus and to an energy storage device. The voltage converter is configured to convert energy from the energy storage device into a voltage bus voltage. The apparatus also includes a supervisory controller coupled to the voltage bus and to the voltage converter. The supervisory controller programmed to iteratively determine a desired voltage bus voltage based on the load and to iteratively calculate a control signal based on the desired voltage bus voltage, the control signal configured to cause the voltage converter to convert the energy from the energy storage device into the voltage bus voltage. The apparatus further includes a voltage bus controller coupled to the voltage bus, to the voltage converter, and to the supervisory controller. The voltage bus controller is programmed to receive the voltage feedback from the voltage bus, receive the control signal from the supervisory controller, and calculate the desired voltage bus voltage based on the control signal The voltage bus controller is also programmed to determine if the voltage feedback is within the threshold of the desired voltage bus voltage and if the voltage feedback is outside of the threshold of the desired voltage bus voltage, calculate a regulatory setpoint signal based on the voltage feedback and based on the desired voltage bus voltage, the regulatory setpoint signal configured to cause the voltage converter to adjust the conversion of the energy from the energy storage device such that the voltage on the voltage bus voltage is within the threshold. A bandwidth of the voltage bus controller to receive the voltage feedback and calculate the regulatory setpoint signal is higher than a bandwidth of the supervisory controller to iteratively receive the voltage feedback and calculate the control signal.

In accordance with yet another aspect of the invention, a system includes a DC-link, a voltage inverter coupled to the DC-link and configured to convert a DC voltage from the DC-link into a first AC voltage, an electromechanical device coupled to the voltage inverter and configured to convert the first AC voltage into a mechanical output, and an energy conversion system. The energy conversion system includes a plurality of energy storage devices configured to store DC energy, a plurality of voltage converters, a power management controller coupled to the plurality of voltage converters, and a first DC-link voltage controller coupled to a first voltage converter of the plurality of voltage converters and to the power management controller. Each voltage converter is coupled to a respective energy storage device and configured to convert a stored voltage from the respective energy storage device into a DC supply voltage based on a setpoint signal and supply the DC supply voltage to the DC-link. The power management controller is coupled to the plurality of voltage converters and configured to iteratively calculate the setpoint signal based on a target voltage for the DC-link and to iteratively supply the setpoint signal to the plurality of voltage converters. The first DC-link voltage controller is configured to iteratively determine the target voltage based on the setpoint signal, to iteratively calculate a first adjustment signal based on a difference between the target voltage and the DC supply voltage, and to iteratively supply the first adjustment signal to the first voltage converter, wherein the first voltage converter is further configured to convert the stored voltage based on the first adjustment signal. A frequency of the power management controller to iteratively calculate the setpoint signal and supply the setpoint signal to the plurality of voltage converters is lower than a frequency of the first DC-link voltage controller to calculate and supply the first adjustment signal to the first voltage converter.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
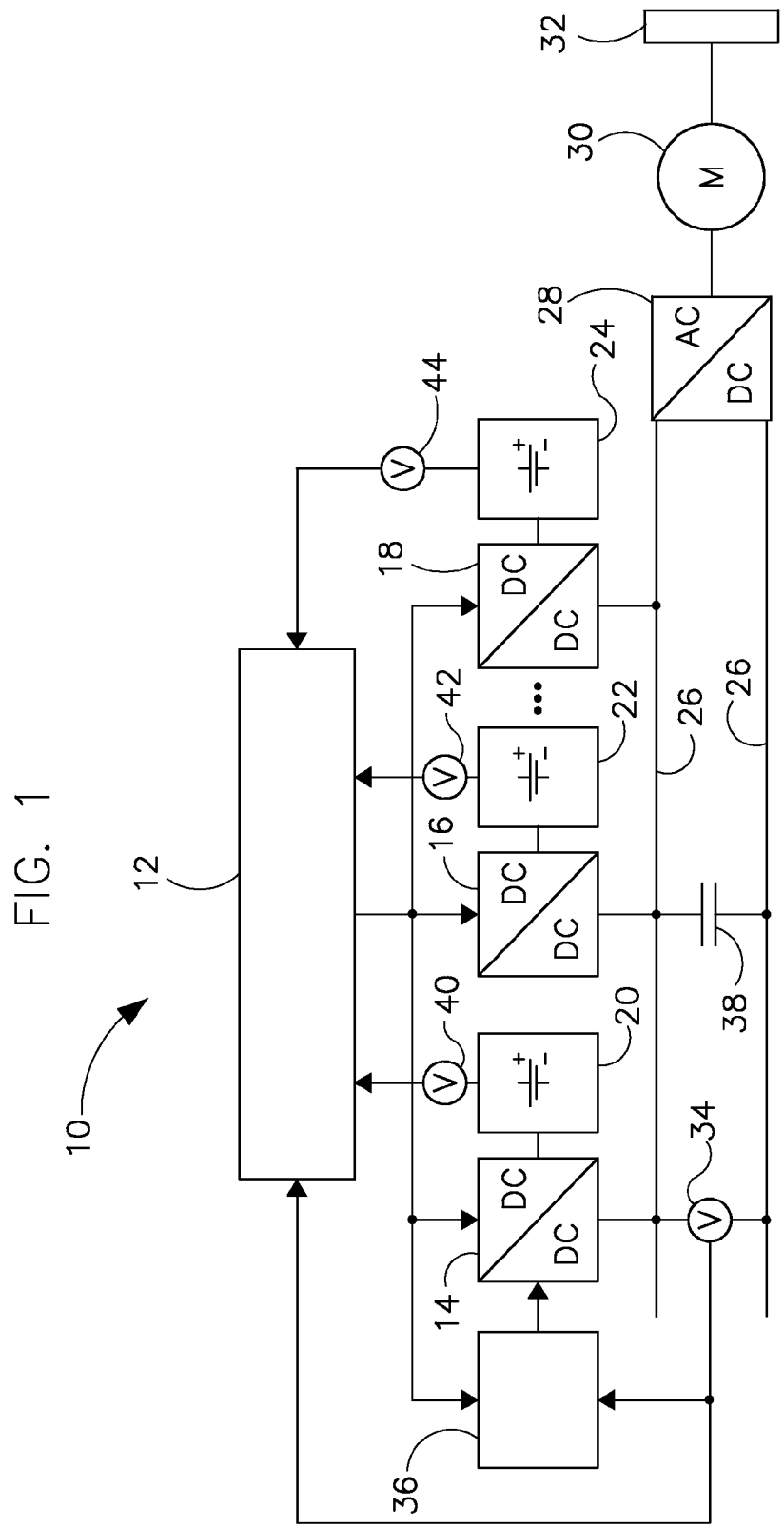
FIG. 1 is a schematic block diagram of a power electronics system according to an embodiment of the invention.

FIG. 1 is a schematic block diagram of the infrastructure of a power electronics system 10 according to an embodiment of the invention. Power electronics system 10 includes a supervisory controller 12 coupled to a plurality of DC-DC voltage converters 14, 16, 18. DC-DC voltage converters 14-18 are coupled to a plurality of energy storage devices 20, 22, 24. In one embodiment, each energy storage device 20-24 may be a power battery, a flywheel system, a fuel cell, an ultracapacitor, or the like. While three pairs of DC-DC voltage converters/energy storage devices are shown, embodiments of the invention are not limited as such, and more or less than the number of DC-DC voltage converters and energy storage devices shown are contemplated.

DC-DC voltage converters 14-18 are also coupled to a DC-link or voltage bus 26, which supplies voltage or energy from DC-DC voltage converters 14-18 to a DC-AC inverter 28 or other load. DC-AC inverter 28, which inverts DC voltage or energy on DC-link 26 into AC voltage or energy is coupled to an electromechanical device or motor 30 to electrically drive motor 30, which mechanically drives a wheel 32 of a hybrid electric or a purely electric vehicle in one embodiment. Hybrid electric vehicles may combine an internal combustion engine (not shown) in addition to electric motor 30 and energy storage device 20-24 to propel the vehicle. Such a combination may increase overall fuel efficiency by enabling the combustion engine and the electric motor 30 to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor such as electromechanical device 30, which propels the vehicle and may also operate auxiliary drives. Purely electric vehicles may use one or more sources of stored electrical energy such as energy storage device 20-24. For example, a first source of stored electrical energy may be used to provide longer-lasting energy while a second source of stored electrical energy may be used to provide higher-power energy for, for example, acceleration.

In another embodiment, power electronics system 10 may be a non-vehicle system, and motor 30 may be coupled to mechanically drive a shaft to perform work.

According to one embodiment, supervisory controller 12 determines a target or desired voltage for DC-link 26 based on the power demands of the load such as DC-AC inverter 28 and motor 30. For example, based on a given speed and load of motor 30, supervisory controller 12 calculates an efficiency optimization for the system. Based on the calculations, supervisory controller 12 calculates a command or power setpoint control signal and transmits the command signal to DC-DC voltage converters 14-18. The command signal is calculated to cause DC-DC voltage converters 14-18 to convert energy stored in energy storage devices 20-24 into a voltage that substantially matches the target voltage. Supervisory controller 12 is configured to iteratively update the calculation of the command signal and supply the updated command signal calculation to DC-DC voltage converters 14-18 to address the speed and load demands of motor 30.

A voltage measurement device 34 coupled to DC-link 26 provides a voltage measurement feedback signal. In one embodiment, the voltage measurement feedback signal represents an average voltage on DC-link 26. In one embodiment, voltage measurement device 34 provides the voltage measurement feedback signal to supervisory controller 12. Using the voltage measurement feedback signal, supervisory controller 12 determines if the voltage on DC-link 26 matches the target voltage or is within a given threshold of the target voltage. For example, supervisory controller 12 may find the difference between the voltage on DC-link 26 and the target voltage. If the voltage on DC-link 26 does not substantially match the target voltage or if the difference between the voltage on DC-link 26 and the target voltage is greater than a threshold, supervisory controller 12 re-calculates the control signal to cause DC-DC voltage converters 14-18 to adjust the voltage such that the voltage on DC-link 26 substantially matches or is within a threshold of the target voltage.

Power electronics system 10 also includes a DC-link voltage controller 36 coupled to supervisory controller 12. DC-link voltage controller 36 receives the command signal from supervisory controller 12 and determines the target or desired DC-link voltage therefrom. DC-link voltage controller 36 is also coupled to voltage measurement device 34 for receiving the voltage measurement feedback signal from voltage measurement device 34. Using the voltage measurement feedback signal, DC-link voltage controller 36 determines if the voltage on DC-link 26 matches or is within a given threshold of the target voltage. For example, DC-link voltage controller 36 may find the difference between the voltage on DC-link 26 and the target voltage. If the voltage on DC-link 26 does not substantially match the target voltage or if the difference between the voltage on DC-link 26 and the target voltage is greater than a threshold, DC-link voltage controller 36 calculates an adjustment or regulatory setpoint signal.

DC-DC voltage converter 14 is coupled to DC-link voltage controller 36 and is configured or programmed to convert energy from energy storage device 20 based on the command signal from supervisory controller 12 as well as based on the adjustment signal from DC-link voltage controller 36. Accordingly, DC-link voltage controller 36 sends the adjustment signal to DC-DC voltage converter 14 to cause DC-DC voltage converter 14 to adjust the voltage to be converted such that the voltage on DC-link 26 substantially matches or is within the threshold of the target voltage. DC-link voltage controller 36 is configured to iteratively update the calculation of the adjustment signal and supply the updated adjustment signal to DC-DC voltage converter 14 to address any imbalance between power into and out of DC-link 26.

According to an embodiment of the invention, DC-link voltage controller 36 has a higher bandwidth than supervisory controller 12. That is, the frequency of DC-link voltage controller 36 to iteratively update the calculation of the adjustment signal and to supply the updated adjustment signal to DC-DC voltage converter 14 is faster or higher than the frequency of supervisory controller 12 to iteratively update the calculation of the command signal and supply the updated command signal calculation to DC-DC voltage converters 14-18. The higher bandwidth control of DC-link voltage controller 36 thus reduces time delays of communication in the feedback loop with DC-link 26. A capacitive device 38 such as a battery, capacitor, or ultracapacitor may be coupled to DC-link 26 to reduce a drop or rise of DC-link voltage between subsequent or new power commands/demands or to filter voltage ripple or buffer energy on DC-link 26. The high bandwidth of the feedback loop of DC-DC voltage converter 14, voltage measurement device 34, and DC-link voltage controller 36 allows for a reduced capacitance requirement for capacitive device 38 and thus a reduced capacitor size and weight.

DC-DC voltage converter 14 similarly has a higher bandwidth than supervisory controller 12. In one embodiment, the bandwidth of DC-DC voltage converter 14 substantially matches the bandwidth of DC-link voltage controller 36. It is also preferred that energy storage device 20 be able to read quickly and to be cycled with microcycles.

FIG. 1 further illustrates a plurality of voltage measurement devices 40, 42, 44 coupled to supervisory controller 12 and configured to measure the voltage or state-of-charge of energy storage devices 20-24. The measured voltages may indicate the availability of power and energy of energy storage devices 20-24. According to an embodiment of the invention, supervisory controller 12 may be configured or programmed to receive and monitor the measured voltages over time. Supervisory controller 12 may use the measured voltages to calculate the command signal to DC-DC voltage converters 14-18 such that the operational lifetime and/or short-term operation of energy storage devices 20-24 are optimized.

Figure 2:
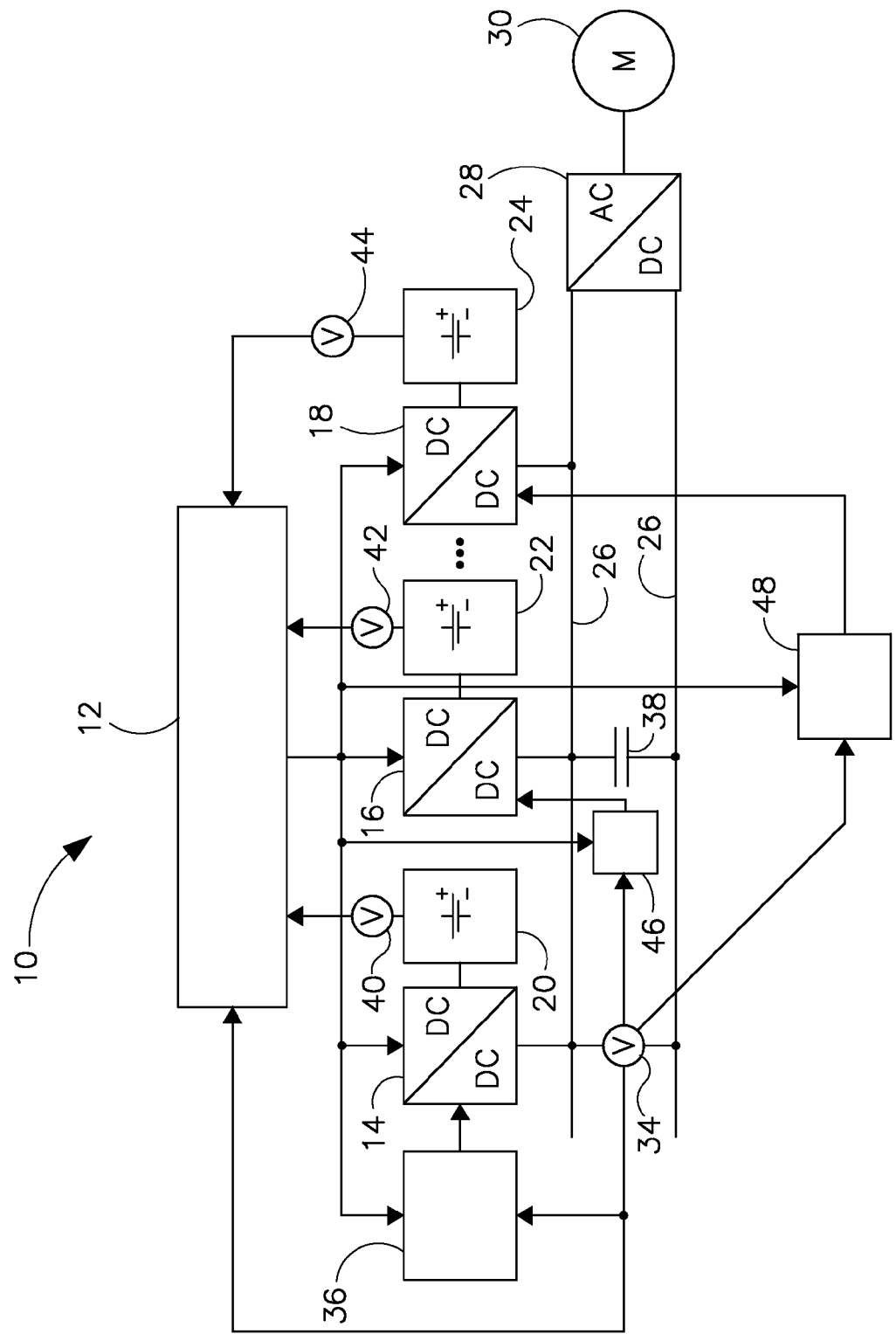
FIG. 2 is a schematic block diagram of a power electronics system according to another embodiment of the invention.

FIG. 2 is a schematic block diagram of power electronics system 10 according to another embodiment of the invention. As shown in FIG. 2, power electronics system 10 includes a second DC-link voltage controller 46 coupled to second DC-DC voltage converter 16 and a third DC-link voltage controller 48 coupled to third DC-DC voltage converter 18. While the embodiment in FIG. 2 shows a DC-link voltage controller coupled to each DC-DC voltage converter, embodiments of the invention may include less voltage controllers than voltage converters. For example, an embodiment of the invention may include two DC-link voltage controllers and three or more pairs of DC-DC voltage converters and energy storage devices.

Similar to DC-link voltage controller 36, DC-link voltage controllers 46, 48 are coupled to supervisory controller 12 and receive the command signal from supervisory controller 12 and determine the target or desired DC-link voltage therefrom. DC-link voltage controllers 46, 48 are also coupled to voltage measurement device 34 for receiving the voltage measurement feedback signal. Using the voltage measurement feedback signal, DC-link voltage controllers 46, 48 determine if the voltage on DC-link 26 matches or is within a given threshold of the target voltage. For example, DC-link voltage controllers 46, 48 may find the difference between the voltage on DC-link 26 and the target voltage. If the voltage on DC-link 26 does not substantially match the target voltage or if the difference between the voltage on DC-link 26 and the target voltage is greater than a threshold, DC-link voltage controllers 46, 48 calculate respective adjustment or regulatory setpoint signals.

DC-DC voltage converters 16, 18 are respectively coupled to DC-link voltage controllers 46, 48 and are configured or programmed to convert energy from energy storage devices 22, 24 based on the command signal from supervisory controller 12 as well as on the respective adjustment signals from DC-link voltage controllers 46, 48. Accordingly, DC-link voltage controllers 46, 48 send the respective adjustment signals to DC-DC voltage converters 16, 18 to cause DC-DC voltage converters 16, 18 to adjust their respective converted voltages such that the voltage on DC-link 26 substantially matches or is within a threshold of the target voltage. DC-link voltage controllers 46, 48 are configured to iteratively update the calculation of the respective adjustment signals and supply the respective updated adjustment signals to DC-DC voltage converters 16, 18 to address any imbalance between power into and out of DC-link 26.

DC-link voltage controllers 46, 48 have a higher bandwidth than supervisory controller 12. That is, the frequency of DC-link voltage controllers 46, 48 to iteratively update the calculation of the respective adjustment signals and to supply the updated adjustment signals to DC-DC voltage converters 16, 18 is faster or higher than the frequency of supervisory controller 12 to iteratively update the calculation of the command signal and supply the updated command signal calculation to DC-DC voltage converters 14-18. DC-DC voltage converters 16, 18 similarly have a higher bandwidth than supervisory controller 12. Furthermore, it is also preferred that energy storage devices 22, 24 be able to read quickly and to be cycled with microcycles.

DC-link voltage controllers 36, 46-48 may be configured or programmed to calculate or modify their respective adjustment signals based on independent threshold levels. For example, DC-link voltage controller 36 may be configured to adjust the voltage on DC-link 26 for differences between the DC-link/target voltages above a first threshold. DC-link voltage controller 46 may be configured to adjust the voltage on DC-link 26 for differences between the DC-link/target voltages below the first threshold but above a second threshold, while DC-link voltage controller 48 may be configured to adjust the voltage on DC-link 26 for differences between the DC-link/target voltages below the second threshold. DC-link voltage controllers 36, 46-48 may thus be designed to provide optimum voltage level adjustment of DC-link 26 for their respective ranges or threshold levels.

Figure 3:
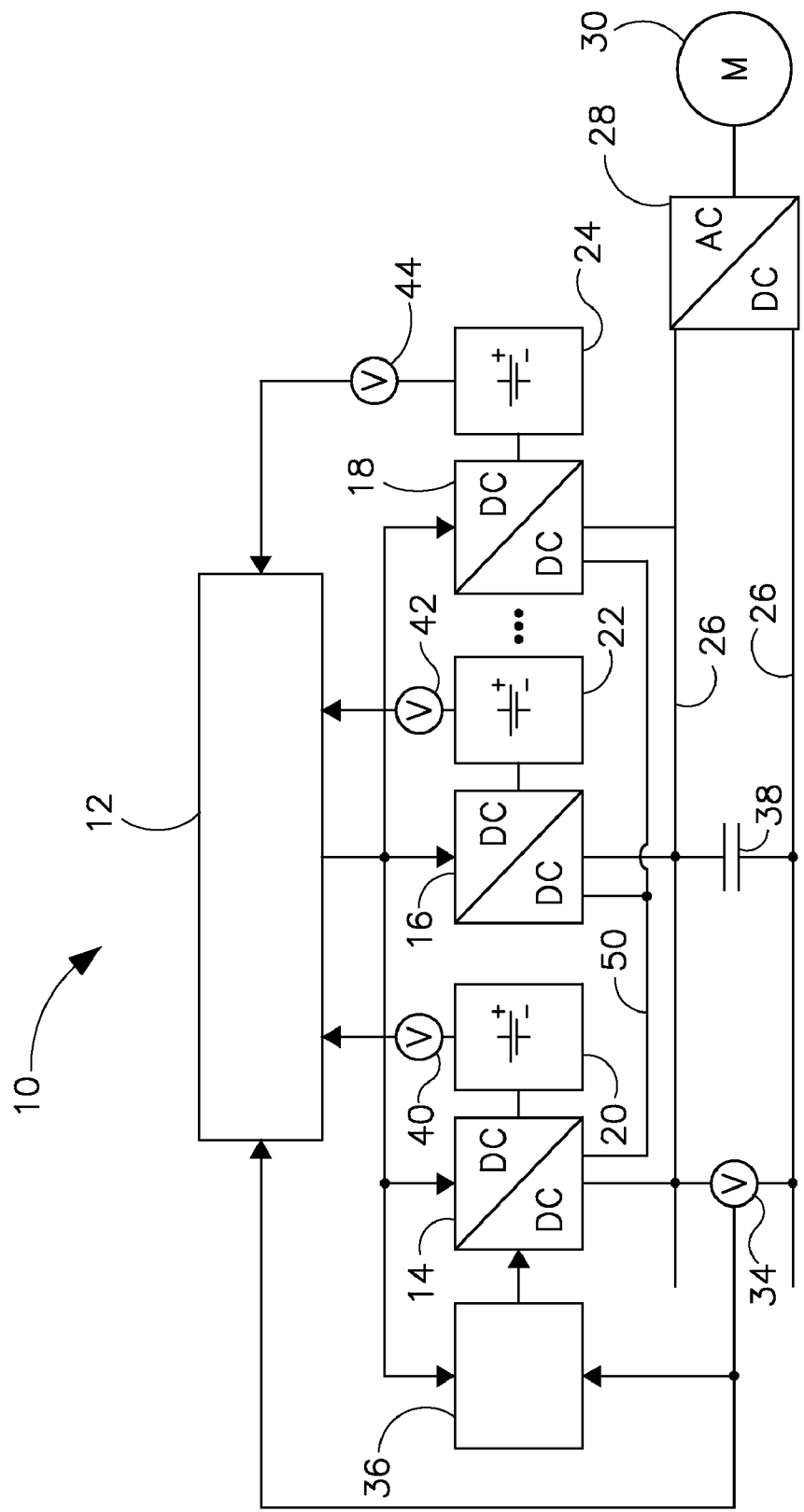
FIG. 3 is a schematic block diagram of a power electronics system according to another embodiment of the invention.

FIG. 3 is a schematic block diagram of power electronics system 10 according to another embodiment of the invention. As shown in FIG. 3, DC-DC voltage converter 14 is coupled to one or more of DC-DC voltage converters 16, 18 via one or more communication lines 50. DC-DC voltage converters 16, 18 are configured or programmed to convert energy from respective energy storage devices 22, 24 based on the command signal from supervisory controller 12 as well as on an adjustment or regulation setpoint signal from DC-DC voltage converter 14.

According to one embodiment, DC-DC voltage converter 14 is configured or programmed to receive the adjustment signal from DC-link voltage controller 36 and to determine a total desired output voltage of DC-DC voltage converter 14 from the command signal and from the adjustment signal. DC-DC voltage converter 14 then determines its output capacity or ability to provide the total desired output voltage. If DC-DC voltage converter 14 determines that it can provide the total desired output voltage, then DC-DC voltage converter 14 supplies the total desired output voltage. However, if DC-DC voltage converter 14 determines that it cannot provide the total desired output voltage, DC-DC voltage converter 14 determines a difference between the output voltage it can provide and the total desired output voltage.

DC-DC voltage converter 14 then calculates and transmits a regulation setpoint signal to either or both of DC-DC voltage converters 16, 18. The regulation setpoint signal calculated by DC-DC voltage converter 14 is configured to cause either or both of DC-DC voltage converters 16, 18 to convert and supply voltage to make up at least the difference between the output voltage that DC-DC voltage converter 14 can provide and the total desired output voltage. DC-DC voltage converters 16, 18 may also be high bandwidth converters and may be positioned on the same hardware or control board as DC-DC voltage converter 14. In one embodiment, DC-DC voltage converters 16, 18 are controlled with similar or identical regulation setpoint signals.

In another embodiment, DC-DC voltage converter 14 may be configured to calculate the regulation setpoint signal based on one or more threshold levels such that DC-DC voltage converters 16, 18 respectively provide increased voltages according to respective first and second adjustment ranges. For example, according to the second adjustment range, DC-DC voltage converter 18 may be caused to increase or decrease its voltage output by smaller or lower amounts than DC-DC voltage converter 16 according to the first adjustment range. In this manner, DC-DC voltage converter 16 may be controlled to address large voltage differences on DC-link 26 while DC-DC voltage converter 18 may be controlled to address small voltage differences on DC-link 26.

According to another embodiment, DC-DC voltage converter 14 may be programmed to handle large or small voltage adjustments, while calculating the regulation setpoint signal to cause DC-DC voltage converter 16, for example, to handle small or large adjustments.

Embodiments of the invention thus allow high bandwidth or frequency control of DC-link voltage variations between a target DC-link voltage and the actual DC-link voltage. In this manner, the size and weight of a DC-link capacitor may be reduced, thus providing higher operational efficiency as well as providing reduced size, weight, and cost constraints.

A technical contribution for the disclosed apparatus is that it provides for a controller implemented technique for controlling power conversion in a power electronics system.

According to one embodiment of the invention, an apparatus includes a DC-link, a load coupled to the DC-link, and an energy conversion system. The energy conversion system includes a first energy storage device, a first voltage converter coupled to the first energy storage device and to the DC-link, a first bus voltage controller coupled to the DC-link and to the first voltage converter, and a supervisory controller coupled to the first voltage converter and to the first bus voltage controller. The first voltage converter is configured to convert a first DC voltage from the first energy storage device into a second DC voltage based on a command signal and based on a first adjustment signal and supply the second DC voltage to the DC-link. The first bus voltage controller is configured to iterate calculation of the first adjustment signal based on the command signal and based on a measured voltage of the DC-link and communicate each iterated calculation of the first adjustment signal to the first voltage converter. The supervisory controller is configured to iterate calculation of the command signal based on the load and based on a desired DC-link voltage for the load and communicate each iterated calculation of the command signal to the first voltage converter and to the first bus voltage controller. A frequency of the first bus voltage controller to communicate each iterated calculation of the first adjustment signal is higher than a frequency of the supervisory controller to communicate each iterated calculation of the command signal.

In accordance with another embodiment of the invention, an apparatus includes a voltage bus, a load coupled to the voltage bus, and a voltage converter coupled to the voltage bus and to an energy storage device. The voltage converter is configured to convert energy from the energy storage device into a voltage bus voltage. The apparatus also includes a supervisory controller coupled to the voltage bus and to the voltage converter. The supervisory controller programmed to iteratively determine a desired voltage bus voltage based on the load and to iteratively calculate a control signal based on the desired voltage bus voltage, the control signal configured to cause the voltage converter to convert the energy from the energy storage device into the voltage bus voltage. The apparatus further includes a voltage bus controller coupled to the voltage bus, to the voltage converter, and to the supervisory controller. The voltage bus controller is programmed to receive the voltage feedback from the voltage bus, receive the control signal from the supervisory controller, and calculate the desired voltage bus voltage based on the control signal. The voltage bus controller is also programmed to determine if the voltage feedback is within the threshold of the desired voltage bus voltage and if the voltage feedback is outside of the threshold of the desired voltage bus voltage, calculate a regulatory setpoint signal based on the voltage feedback and based on the desired voltage bus voltage, the regulatory setpoint signal configured to cause the voltage converter to adjust the conversion of the energy from the energy storage device such that the voltage on the voltage bus voltage is within the threshold. A bandwidth of the voltage bus controller to receive the voltage feedback and calculate the regulatory setpoint signal is higher than a bandwidth of the supervisory controller to iteratively receive the voltage feedback and calculate the control signal.

In accordance with yet another embodiment of the invention, a system includes a DC-link, a voltage inverter coupled to the DC-link and configured to convert a DC voltage from the DC-link into a first AC voltage, an electromechanical device coupled to the voltage inverter and configured to convert the first AC voltage into a mechanical output, and an energy conversion system. The energy conversion system includes a plurality of energy storage devices configured to store DC energy, a plurality of voltage converters, a power management controller coupled to the plurality of voltage converters, and a first DC-link voltage controller coupled to a first voltage converter of the plurality of voltage converters and to the power management controller. Each voltage converter is coupled to a respective energy storage device and configured to convert a stored voltage from the respective energy storage device into a DC supply voltage based on a setpoint signal and supply the DC supply voltage to the DC-link. The power management controller is coupled to the plurality of voltage converters and configured to iteratively calculate the setpoint signal based on a target voltage for the DC-link and to iteratively supply the setpoint signal to the plurality of voltage converters. The first DC-link voltage controller is configured to iteratively determine the target voltage based on the setpoint signal, to iteratively calculate a first adjustment signal based on a difference between the target voltage and the DC supply voltage, and to iteratively supply the first adjustment signal to the first voltage converter, wherein the first voltage converter is further configured to convert the stored voltage based on the first adjustment signal. A frequency of the power management controller to iteratively calculate the setpoint signal and supply the setpoint signal to the plurality of voltage converters is lower than a frequency of the first DC-link voltage controller to calculate and supply the first adjustment signal to the first voltage converter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
   a DC-link;
   a load coupled to the DC-link; and
   an energy conversion system comprising:
      a first energy storage device;
      a first voltage converter coupled to the first energy storage device and to the DC-link, the first voltage converter configured to:
         convert a first DC voltage from the first energy storage device into a second DC voltage based on a command signal and based on a first adjustment signal; and
         supply the second DC voltage to the DC-link;
      a first bus voltage controller coupled to the DC-link and to the first voltage converter, the first bus voltage controller configured to:
         iterate calculation of the first adjustment signal based on the command signal and based on a measured voltage of the DC-link; and
         communicate each iterated calculation of the first adjustment signal to the first voltage converter;
      a supervisory controller coupled to the first voltage converter and to the first bus voltage controller, the supervisory controller configured to:
         iterate calculation of the command signal based on the load and based on a desired DC-link voltage for the load; and
         communicate each iterated calculation of the command signal to the first voltage converter and to the first bus voltage controller; and
      wherein a frequency of the first bus voltage controller to communicate each iterated calculation of the first adjustment signal is higher than a frequency of the supervisory controller to communicate each iterated calculation of the command signal.

2. The apparatus of claim 1 further comprising a voltage measurement device coupled to the DC-link and configured to:
   measure a voltage of the DC-link; and
   communicate the measured voltage to the first bus voltage controller.

3. The apparatus of claim 1 further comprising:
   a second energy storage device;
   a second voltage converter coupled to the second energy storage device and to the DC-link, the second voltage converter configured to:
      convert a third DC voltage from the second energy storage device into a fourth DC voltage based on the command signal; and
      supply the fourth DC voltage to the DC-link.

4. The apparatus of claim 3 wherein the second voltage converter is further configured to convert the third DC voltage into the fourth DC voltage based on the command signal and based on a regulation setpoint signal transmitted from the first voltage converter.

5. The apparatus of claim 4 wherein the first voltage converter is configured to:
   determine a total desired output voltage of the first voltage converter from the command signal and from the first adjustment signal;
   determine a difference between the second DC voltage supplied to the DC-link and the total desired output voltage;
   calculate the regulation setpoint signal based on the difference, the regulation setpoint signal configured to cause the second voltage converter to increase the fourth DC voltage by the difference; and
   transmit the regulation setpoint signal to the second voltage converter.

6. The apparatus of claim 3 wherein the energy conversion system further comprises:
   a second bus voltage controller coupled to the DC-link and to the second voltage converter, the second bus voltage controller configured to:
      iterate calculation of a second adjustment signal based on the command signal and based on the measured voltage of the DC-link; and
      communicate each iterated calculation of the second adjustment signal to the second voltage converter;
   wherein the second voltage converter is further configured to convert the third DC voltage into the fourth DC voltage based on the command signal and based on the second adjustment signal.

7. The apparatus of claim 6 wherein the first energy storage device comprises one of a battery and an ultracapacitor.

8. The apparatus of claim 1 further comprising a second energy storage device coupled to the DC-link and configured to filter voltage ripple on the DC-link and to buffer energy.

9. The apparatus of claim 8 wherein the second energy storage device comprises one of a battery and an ultracapacitor.

10. The apparatus of claim 1 wherein the load comprises:
    a voltage inverter coupled to the DC-link and configured to convert a DC voltage from the DC-link into a first AC voltage; and
    an electromechanical device coupled to the voltage inverter and configured to convert the first AC voltage into a mechanical output.

11. An apparatus comprising:
    a voltage bus;
    a load coupled to the voltage bus;

a voltage converter coupled to the voltage bus and to an energy storage device; the voltage converter configured to convert energy from the energy storage device into a voltage bus voltage;
a supervisory controller coupled to the voltage bus and to the voltage converter, the supervisory controller programmed to iteratively:
  determine a desired voltage bus voltage based on the load; and
  calculate a control signal based on the desired voltage bus voltage, the control signal configured to cause the voltage converter to convert the energy from the energy storage device into the voltage bus voltage;
a voltage bus controller coupled to the voltage bus, to the voltage converter, and to the supervisory controller, the voltage bus controller programmed to:
  receive the voltage feedback from the voltage bus;
  receive the control signal from the supervisory controller;
  calculate the desired voltage bus voltage based on the control signal;
  determine if the voltage feedback is within the threshold of the desired voltage bus voltage; and
  if the voltage feedback is outside of the threshold of the desired voltage bus voltage, calculate a regulatory setpoint signal based on the voltage feedback and based on the desired voltage bus voltage, the regulatory setpoint signal configured to cause the voltage converter to adjust the conversion of the energy from the energy storage device such that the voltage on the voltage bus voltage is within the threshold; and
wherein a bandwidth of the voltage bus controller to receive the voltage feedback and calculate the regulatory setpoint signal is higher than a bandwidth of the supervisory controller to iteratively receive the voltage feedback and calculate the control signal.

12. The apparatus of claim 11 further comprising a first voltage measurement device coupled to the voltage bus and configured to:
  measure the voltage on the voltage bus; and
  provide the measured voltage as the voltage feedback to the voltage bus controller.

13. The apparatus of claim 12 wherein the first voltage measurement device, in being configured to measure the voltage on the voltage bus, is configured to measure an average voltage on the voltage bus.

14. The apparatus of claim 12 further comprising:
a second voltage measurement device coupled to the energy storage device and configured to:
  measure a state-of-charge of the energy storage device; and
  provide the measured state-of-charge to the supervisory controller; and
wherein the supervisory controller is further programmed to calculate the control signal to optimize an operational life of the energy storage device.

15. The apparatus of claim 11 wherein the load comprises:
a voltage inverter coupled to the voltage bus and configured to convert a DC voltage from the voltage bus into an AC voltage; and
a motor coupled to the voltage inverter and configured to convert the AC voltage into a mechanical output.

16. A system comprising:
a DC-link;
a voltage inverter coupled to the DC-link and configured to convert a DC voltage from the DC-link into a first AC voltage;
an electromechanical device coupled to the voltage inverter and configured to convert the first AC voltage into a mechanical output; and
an energy conversion system comprising:
  a plurality of energy storage devices configured to store DC energy;
  a plurality of voltage converters, each voltage converter coupled to a respective energy storage device and configured to:
    convert a stored voltage from the respective energy storage device into a DC supply voltage based on a setpoint signal; and
    supply the DC supply voltage to the DC-link;
  a power management controller coupled to the plurality of voltage converters and configured to iteratively:
    calculate the setpoint signal based on a target voltage for the DC-link; and
    supply the setpoint signal to the plurality of voltage converters;
  a first DC-link voltage controller coupled to a first voltage converter of the plurality of voltage converters and to the power management controller, wherein the first DC-link voltage controller is configured to iteratively:
    determine the target voltage based on the setpoint signal;
    calculate a first adjustment signal based on a difference between the target voltage and the DC supply voltage; and
    supply the first adjustment signal to the first voltage converter, wherein the first voltage converter is further configured to convert the stored voltage based on the first adjustment signal; and
  wherein a frequency of the power management controller to iteratively calculate the setpoint signal and supply the setpoint signal to the plurality of voltage converters is lower than a frequency of the first DC-link voltage controller to calculate and supply the first adjustment signal to the first voltage converter.

17. The system of claim 16 wherein the first voltage converter is further coupled to a second voltage converter of the plurality of voltage converters, wherein the first voltage converter is configured to iteratively:
  calculate a second adjustment signal based on the target voltage and the DC supply voltage of the first voltage converter; and
  supply the second adjustment signal to the second voltage converter, wherein the second voltage converter is further configured to convert the stored voltage based on the second adjustment signal.

18. The system of claim 17 wherein the first voltage converter is further configured to:
  calculate the second adjustment signal based on a first voltage adjustment range;
  calculate a third adjustment signal based on a second voltage adjustment range, wherein the second adjustment range is smaller than the first adjustment range; and
  supply the third adjustment signal to a third voltage converter of the plurality of voltage converters.

19. The system of claim 16 further comprising:
a second DC-link voltage controller coupled to a second voltage converter of the plurality of voltage converters and to the power management controller, wherein the second DC-link voltage controller is configured to iteratively:
  determine the target voltage based on the setpoint signal;

calculate a second adjustment signal based on a difference between the target voltage and the DC supply voltage; and supply the second adjustment signal to the second voltage converter, wherein the second voltage converter is further configured to convert the stored voltage based on the second adjustment signal; and wherein a frequency of the power management controller to iteratively calculate the setpoint signal and supply the setpoint signal to the plurality of voltage converters is lower than a frequency of the second DC-link voltage controller to calculate and supply the second adjustment signal to the second voltage converter.

20. The system of claim 16 further comprising a wheel coupled to the electromechanical device, wherein the apparatus comprises an electric vehicle.

* * * * *